(12) United States Patent
Angele et al.

(10) Patent No.: US 7,290,111 B2
(45) Date of Patent: Oct. 30, 2007

(54) COMPUTER SYSTEM

(75) Inventors: Jurgen Angele, Kandel (DE); Dieter Fensel, Amsterdam (NL)

(73) Assignee: ontoprise GmbH, Karisruhe (DE)

( * ) Notice: Subject to any disclaimer, the term of this patent is extended or adjusted under 35 U.S.C. 154(b) by 0 days.

(21) Appl. No.: 10/967,237

(22) Filed: Oct. 19, 2004

(65) Prior Publication Data

US 2005/0120044 A1   Jun. 2, 2005

Related U.S. Application Data

(63) Continuation-in-part of application No. 10/629,587, filed on Jul. 30, 2003, now abandoned, which is a continuation-in-part of application No. PCT/EP02/00913, filed on Jan. 30, 2002, application No. 10/967,237, and a continuation-in-part of application No. 10/694,182, filed on Oct. 28, 2003, which is a continuation of application No. PCT/EP02/00913, filed on Jan. 30, 2002.

(30) Foreign Application Priority Data

Jan. 30, 2001 (DE) ................. 101 03 845

(51) Int. Cl.
*G06F 12/00* (2006.01)
(52) U.S. Cl. .................... 711/170
(58) Field of Classification Search ......... 706/47; 707/101; 709/229; 715/505; 711/170
See application file for complete search history.

(56) References Cited

U.S. PATENT DOCUMENTS 5,720,009 A * 2/1998 Kirk et al. .............. 706/47
6,311,194 B1 * 10/2001 Sheth et al. ............ 715/505
2001/0056429 A1 * 12/2001 Moore et al. ........... 707/101
2002/0156904 A1 * 10/2002 Gullotta et al. ......... 709/229

FOREIGN PATENT DOCUMENTS

WO   WO 200221259 A1 *   3/2002

OTHER PUBLICATIONS

Wenhau Wu, David M. Dilts, IEEE Student Member, "Integrating Diverse CIM Data Bases: The Role of Natural Language Interface, IEEE Transactions on Systems, Man, and Cybernetics", Nov./Dec. 22, 1992 No. 6, New York, US.*
Jack Howard, SCHAFER CORP, "DAML (enabing "agent " communication at a Web-wide scale)", Dec. 1999, DAML Program Review Mar. 2000, PowerPoint Presentation.*

(Continued)

*Primary Examiner*—Pierre Bataille
*Assistant Examiner*—Paul Schlie
(74) *Attorney, Agent, or Firm*—Buchanan Ingersoll & Rooney PC

(57) ABSTRACT

A computer system and method for efficient storage and retrieval of data. The inventive computer system may comprise means for storing data, wherein data are allocated to predetermined categories that are components of at least one stored categorical structure forming an object model, wherein attributes that are inherited within the categorical structure are allocated to the categories; at least one inquiry unit for making queries relating to the stored data; and at least one inference unit used to evaluate declarative rules linking at least one of said categories and said attributes.

34 Claims, 6 Drawing Sheets

OTHER PUBLICATIONS

Kenneth Baclawski, Northeastern University, Ontology-Based Computing, Jun. 2001, DAML. Program Review, PowerPoint Presentation.*

Michael Kifer, SUNY at Stony Book, George Lausen University Mannheim, "F-Logic: A Higher-Order Language for Reasoning about Objects, Inheritance, and Scheme", 1989, ACM, pp. 134-146.*

*Jeffrey D. Ullman, "Principles of Database and Knowledge-Base Systems", Computer Science Press, vol. 1, pp. ix, xi, vol. 2, pp. ix, xi; Rockville, Maryland, USA, 1988.
*Allen Van Gelder et al., "The Well-Founded Semantics for General Logic Programs", Journal of the ACM, vol. 38, Issue 3, pp. 620-650, New York, NY, USA.
*Jurgen Angele et al., "Ontologies in F-logic" in: S. Staab, R. Studer (Editors): Handbook on Ontologies in Information Systems, Springer-Verlag, 2003, p. 29, Heidelberg, Germany.

* cited by examiner

COMPUTER SYSTEM

CROSS-REFERENCE TO RELATED APPLICATION

This application is a continuation-in-part of U.S. patent application Ser. No. 10/629,587, filed Jul. 30, 2003, incorporated herein by reference, which is a continuation-in-part of PCT International Application No. PCT/EP02/00913, filed Jan. 30, 2002, which claims the priority of German Patent Application No. 101 03 845, filed on Jan. 30, 2001.

Furthermore, this application is a continuation-in-part of U.S. patent application Ser. No. 10/694,182, filed Oct. 28, 2003, incorporated herein by reference, which is a continuation of PCT International Application No. PCT/EP02/00913, filed Jan. 30, 2002, which claims the priority of German Patent Application No. 101 03 845, filed on Jan. 30, 2001.

FIELD OF THE INVENTION

The present invention addresses computer systems and methods for the efficient storage and recovery of information.

DESCRIPTION OF RELATED ART

Computer systems of the type with which the present invention is concerned are often formed with computer units connected into a network, which are provided with integrated means for storing data, especially database systems. In particular, the computer units can also be connected to the Internet, so that an query to the database systems can be sent via the Internet.

Database systems of this type generally contain large data records that can be queried with the aid of specific query commands. One major problem occurring in particular with database systems containing large amounts of stored data is the fact that suitable query commands must be defined for obtaining the desired search results.

Searches of this type are particularly difficult if data is requested that deals with general subjects, but only a few searchable data terms are known for the defined subjects. For example, suppose that a computer system comprises database systems in which different types of publications from the technical, medical and business fields are stored. A user of the database system knows the name of an author of a publication, but knows no information other than that the publication is a technical publication. Thus, the single search term available to the user is the name of the author of this publication. This name is used as input variable for the search and is input into the computer system by using an inquiry unit. Because no other information is available, the user must then search through all the query material relating to the searched name to find the desired publication, if necessary using additionally obtained information on the author. An additional manual evaluation of this type is extremely tedious and is also the source of many errors, so that the search result is subject to considerable inaccuracies.

SUMMARY OF THE INVENTION

It is an object of the present invention to create a computer system of the aforementioned type and an associated method to ensure the most comprehensive, simple and flexible access to information stored in the computer system.

According to a first exemplary embodiment, the invention comprises a computer system that includes data storage means, e.g. a database in a computer memory, and an inquiry unit for determining output variables by accessing data stored in the data storage means. The data in the data storage means are structured with the help of predetermined categories that are components of at least one categorical structure forming an object model. Alternatively, the data can be stored within the computer memory in accordance with the given structure. An example for a category can be the category "person". Attributes, which are inherited within a categorical structure, are allocated to the categories. An example of an attribute for the category person is the "name" of a person. Categories or data can be linked via relations. E.g., person A is "cooperating with" person B. The object model contains links to the stored data to make them accessible with the help of the object model. The data are called "instances" of the categories und attributes. The inquiry unit comprises an inference unit that evaluates declarative rules linking predetermined categories and/or attributes and/or relations. One important characteristic of a declarative system of rules is that the result of an evaluation of the rules does not depend on the sequence of evaluation of the rules. By thus applying the inference unit, it is possible to reveal not explicitly stated linkages among various categories, attributes, relations and data, i.e. discover new knowledge.

The object model is preferably realized as a hierarchical structure of categories. Within hierarchical structures, the categories in a predetermined level are respectively allocated to precisely one category of a superior level, meaning only single inheritances are permitted. In general, the categorical structure can also be more generally embodied as an acyclic graph for which multiple inheritances are permitted.

According to a second exemplary embodiment of the invention, methods are provided for storing, structuring and retrieving data in a computer system. A hierarchical categorical structure is generated in the form of an object model, having categories, relations between the categories and attributes associated with the categories. The attributes are inherited within the categorical structure. The stored data are structured according to the object model. Queries are processed, during which processing declarative rules linking categories and/or relations and/or attributes are evaluated. A predetermined subset or a correlation between or among subsets of categories and/or attributes and/or data may be derived as output variables in response to a query. Relations among various categories, attributes and data may also be provided as output variables.

A computer system according to the invention may comprise a network of computers, and the network connecting the computers may, for example, be the Internet. Accordingly, the inventive method may be implemented across such a network of computers. Each computer may be equipped with data storage means and/or query means and/or inference means.

The method may be implemented in the form of software code contained in a computer-readable medium, such as a hard disk, a floppy disk, a CD-ROM, RAM, ROM, PROM, etc. A computer system according to the present invention may be equipped with suitable means to read and execute the software code from the computer-readable medium, and may further contain one or more processors and one or more data storage means. The software code may further be communicated between or among various computer systems by means of a communications medium having a data-modulated signal that has been modulated according to the software code.

The data storage means may comprise any memory means, including RAM, ROM, hard disk, etc. It may also comprise multiple memory devices, including multiple devices associated with multiple computers (i.e., it may be "distributed").

Thus, the invention is based upon the basic idea that the data stored in the computer system are structured within at least one object model, preferably within several object models. Object models of this type, which are often called ontologies, are divided into categories with hierarchical or associative structures, wherein several attributes, which are inherited within a categorical structure, are preferably allocated to the categories. Different categories can be linked by relations. According to the invention, the information stored in the computer system may be accessed, but need not be solely accessed, by a query of the data stored therein. Instead, the computer system according to the invention is provided with a pre-defined number of declarative rules that are allocated to at least one inference unit.

Attributes of at least one categorical structure and/or categories of at least one categorical structure, and if necessary, also stored data, can thus be linked using the declarative rules. The declarative rules here represent the logical linking instructions, which relate the individual aforementioned elements in a pre-defined manner to each other. An evaluation is made in the inference unit by allocating, e.g., concrete values for the attributes, categories and/or data to these declarative rules, thus generating specific output variables.

According to the invention, the query (or inquiry) and evaluation of information is thus not limited to the level of the data stored in the computer system. Rather, the inquiries are expanded to include structural elements of the object models used to structure the data. As a result, even complex facts and dependencies can be extracted from the information stored in the computer system using only rudimentary and simple inquiries and/or input values.

For the formulation of queries, often the logic language F-Logic is a useful tool (see, e.g., J. Angele, G. Lausen: "Ontologies in F-Logic" in S. Staab, R. Studer (Eds.): Handbook on Ontologies in Information Systems. International Handbooks on Information Systems, Springer, 2003, page 29). In order to gain some intuitive understanding of the functionality of F-Logic, the following example might be of use, which maps the relations between well-known biblical persons:

First, some facts:

```
abraham:man.
sarah:woman.
isaac:man[fatherIs->abraham; motherIs->sarah].
ishmael:man[fatherIs->abraham; motherIs->hagar:woman].
jacob:man[fatherIs->isaac; motherIs->rebekah:woman].
esau:man[fatherIs->isaac; motherIs->rebekah].
```

Obviously, some categories are defined: "man" and "woman". E.g., Abraham is a man. The category "man" has the attributes "fatherIs" and "motherIs", which are indicating the parents. E.g., the man Isaac has the father Abraham and the mother Sarah.

F-Logic is also suited for defining the categorial structure of an ontology. Nevertheless, in most cases, the ontology languages RDF or OWL are used for these purposes.

Further, some rules are given, defining the dependencies between the categories:

```
FORALL X,Y X[sonIs->>Y] <- Y:man[fatherIs->X].
FORALL X,Y X[sonIs->>Y] <- Y:man[motherIs->X].
FORALL X,Y X[daughterIs->>Y] <- Y:woman[fatherIs->X].
FORALL X,Y X[daughterIs->>Y] <- Y:woman[motherIs->X].
```

Rules written using F-Logic consist of a rule header (left side) and a rule body (right side). Thus, the first rule in the example given above means in translation: If Y is a man, whose father was X, then Y is one of the (there might be more than one) sons of X. The simple arrow "->" indicates that, for a given attribute or relation, only one value is possible, whereas the double-headed arrow "->>" indicates that more than one value might be assigned to an attribute or relation.

Finally, we formulate a query, inquiring for all women having a son whose father is Abraham. In other words: With which women did Abraham have a son?

FORALL X,Y>-X:woman[sonIs->>Y[fatherIs->abraham]].

The syntax of a query is similar to the definition of a rule, but the rule header is omitted.

The answer is:

X=sarah

X=hagar

Thus, by evaluating the rules, the means of a query are widely extended as compared to conventional database systems.

A computer unit with an integrated database system, structured as discussed above, represents a simple example of a type of computer system according to the invention. A query relating to specific categories or attributes makes it possible to obtain data subsets as output variables without a direct query about the data itself. Query sequences of this type are particularly advantageous because data can be categorized according to easily searched specific criteria and characteristics with the categories and attributes of categorical structures. For example, personnel data can be structured so as to be divided into different categories that are based on the employee hierarchy of a company. A categorical structure of this type may, for example, contain the category "employees" on a first level, which is then divided further into the sub-categories "technical employees" and "clerical employees". These sub-categories can be divided further into additional sub-categories to which the gender of an employee or other characteristics can be allocated as attributes.

With a computer system and method according to the invention, a query of specific categories and attributes can be used to determine the employees allocated to these elements without necessitating a direct query into the concrete data for these employees, e.g., name, address and department designation within the firm. An especially powerful and flexible query system is thus created as a result of the option of processing a query in the category and/or relation and/or attribute level above the data level, which considerably expands the search options as compared to traditional database systems.

Another advantage of the method and computer system according to the invention is that a user can enter several query terms as input variables into the computer system without having to make a distinction whether these query terms are data, categories or attributes to be searched. These query terms, as input variables, are linked in the inference unit with declarative rules allocated to the respective query command. With the aid of these declarative rules, the query commands are allocated to the data, categories and/or attributes of an object model. Data subsets are obtained as output variables, which are at a predetermined correlation to each other, depending on the setup for these declarative rules. In the simplest case, the query terms are linked to form a single output variable.

According to another advantageous embodiment, correlation among attributes, categories and/or data for the various object models can be obtained with the inference unit and the declarative rules allocated to this unit. That is, correlations among various attributes, categories and/or data may be determined, e.g., during the processing involved with data retrieval.

A system of this type can advantageously be used as interface unit between two different computer units, connected into a network. Two database systems that are integrated into the computer units of two different firms represent one example for this. Data is to be transferred between both database systems automatically, if possible, via a computer network and, in particular, via the Internet. Requirements of this type arise particularly in the area of e-commerce. For example, systems of this type should automatically handle orders between manufacturing firms and their authorized suppliers. However, the different schemata used for storing data in the database systems of different firms present a problem. Accordingly, the object models for structuring the individual database systems differ significantly. At least one inference unit is, therefore, allocated to these database systems as an interface unit to ensure, nonetheless, a non-problematic data transfer between the database systems. The declarative rules allocated to the inference unit translate the structures of the object model for one of the database systems into the object model of the second database system. As a result, a defined allocation of the transferred data is always ensured during a transfer of data from one database system to another.

BRIEF DESCRIPTION OF THE DRAWINGS

The invention is explained in the following with the aid of the drawings, in which.

DETAILED DESCRIPTION OF PREFERRED EMBODIMENTS

Figure 1:
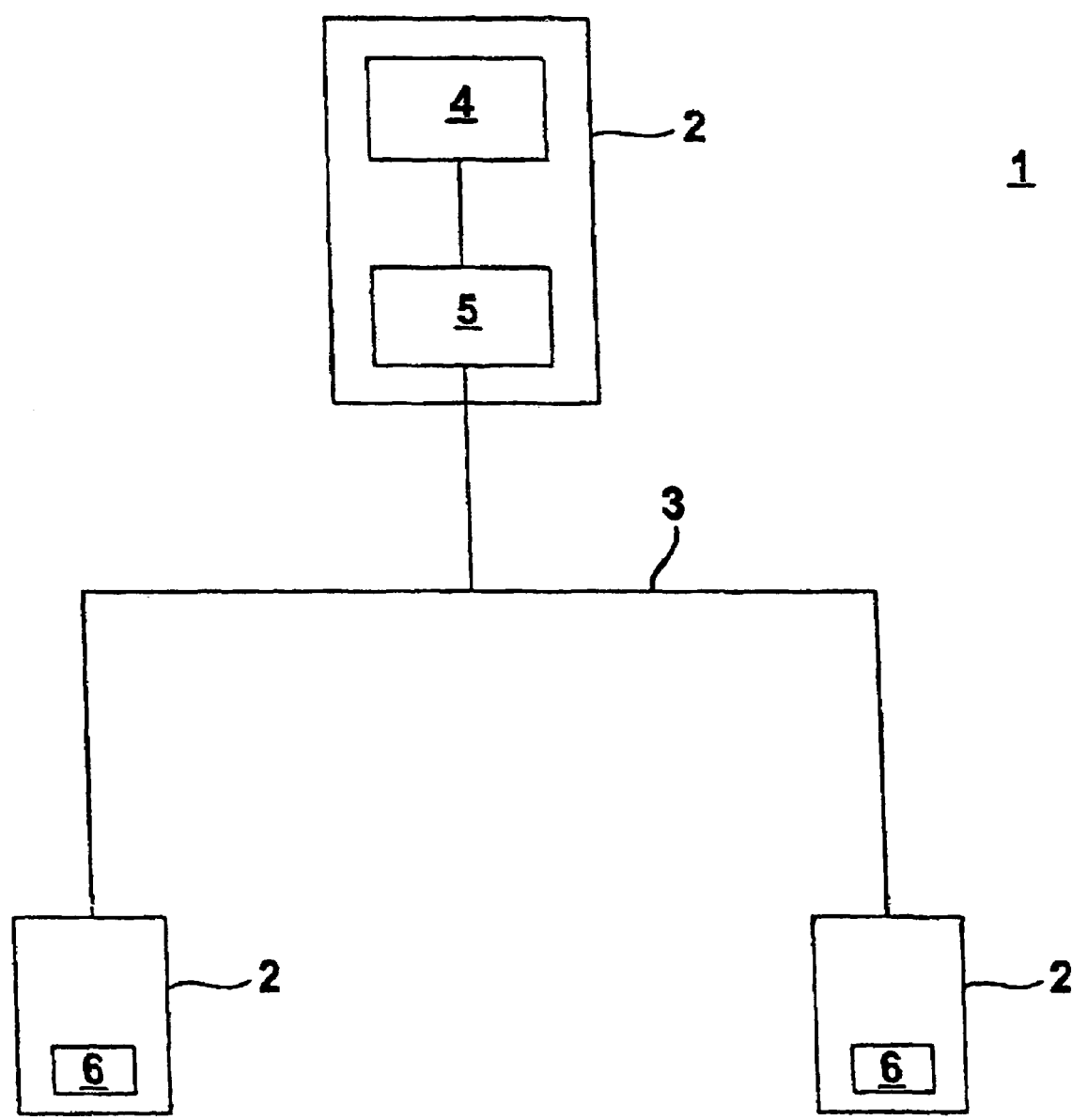
FIG. 1 shows a configuration of a first exemplary embodiment of a computer system according to the invention.

FIG. 1 schematically shows the basic configuration of a first exemplary embodiment of a computer system 1 according to the invention. The computer system 1 comprises several computer units 2 that are connected into a network via computer lines 3. One of the computer units 2 is a central computer containing stored data. A database system 4 functions as a means for storing the data. An inference unit 5 is provided for processing and evaluating inquiries to the database system 4.

Several users can access the database system 4 via additional computer units 2, e.g., personal computers, which are connected into the network. The computer units 2 are provided for this purpose with suitable input/output units 6, having terminals that are not separately shown in FIG. 1.

The Internet, in particular, can function as the network, in which case the computer units 2 are provided with respective Internet connections.

Object models are used for structuring the data stored in the database system 4. The preferred object model (ontology) is divided into categories forming a hierarchical structure.

Figure 2:
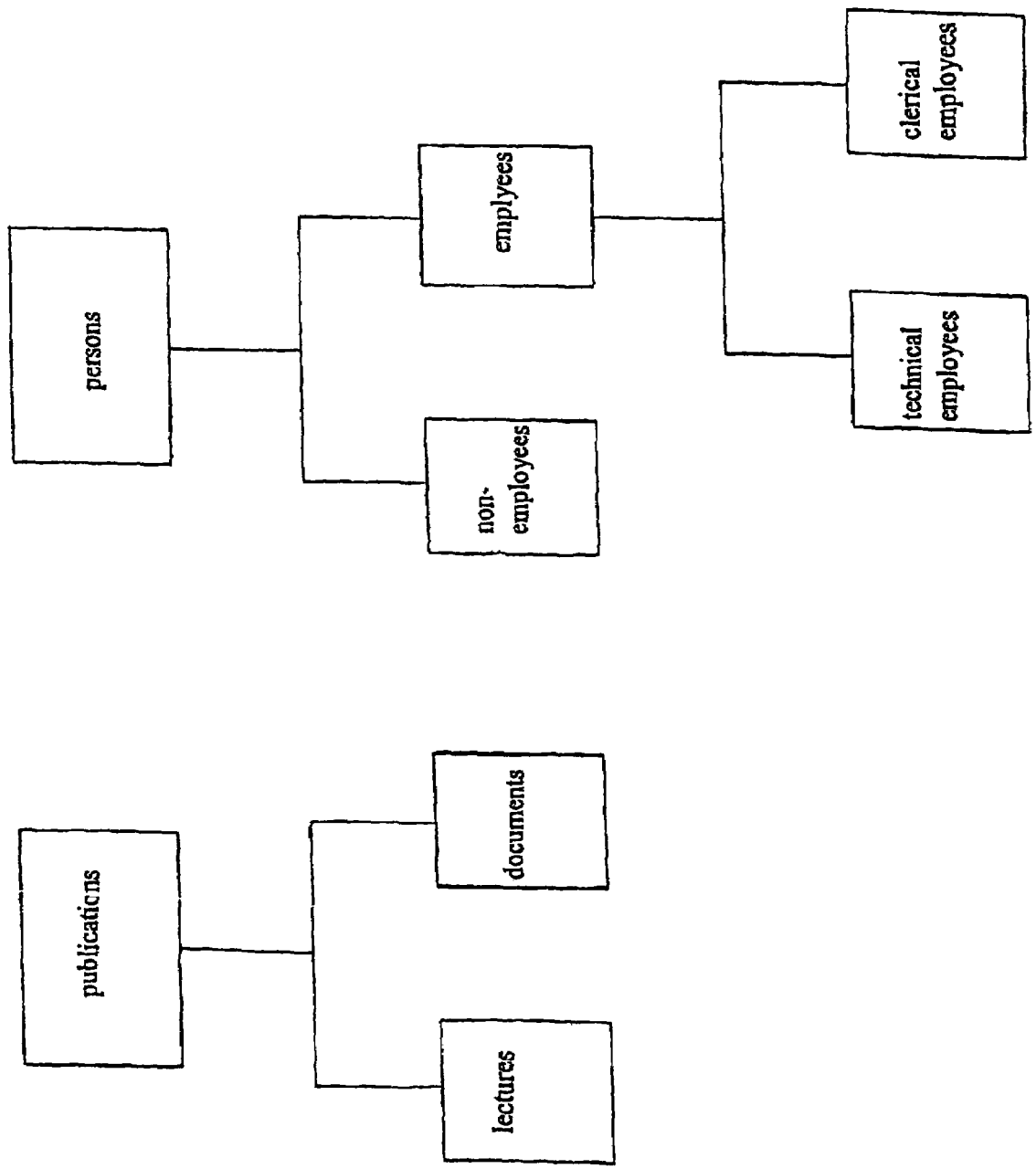
FIG. 2 shows object models for structuring the data stored on the computer system according to FIG. 1.

FIG. 2 shows examples of two such hierarchical categorical structures that respectively form one object model. The first object model contains a "publications" category to which the sub-categories "lectures" and "documents" are allocated. The second object model contains a "persons" category to which the sub-categories "non-employees" and "employees" are allocated, and the additional sub-categories "technical employees" and "clerical employees" are allocated to the sub-category "employees".

Specific attributes may be allocated to the categories of a hierarchical categorical structure. An attribute allocated to a category, e.g., the category "persons", is inherited by the sub-categories of this category. An attribute of this type, for example, can be a name.

For the present example, this attribute is inherited within the categorical structure to the sub-categories "non-employees" and "employees", as well as to the sub-categories for this latter category, "clerical employees" and "technical employees". Example: If the category "persons" has the attribute "name" then the sub-category "employees" would inherit "name". You don't have to specify that "employees" has the attribute "name".

In most cases, only the attributes are inherited within the ontology rather than the actual values of these attributes. Thus, not every employee would inherit the value of the attribute "name"—e.g. "Jones". Nevertheless, in some cases, it makes sense to pre-define a "default-value" of an attribute, which is inherited, too, within the ontology. Where needed, this default value may be "overridden" in lower sub-categories. Example: It might make sense to assign the value "John Doe" to the attribute "name". However, if the actual name of a certain technical the employee is "Charles Lindbergh", the value "John Doe" is overridden by "Charles Lindbergh" for this specific person.

A particularly efficient structuring of the data in the database system 4 is created as a result.

Declarative rules are allocated to the inference unit 5 for processing inquiries to the database system 4. These declarative rules are stored in the inference unit 5 itself or in a memory unit that is allocated to the inference unit 5, but which is not shown in FIG. 1.

The number of declarative rules and the development of these declarative rules are adapted to the patterns for the inquiries to be processed and are preferably input during the installation of the inference unit 5 by an authorized operator, e.g., a so-called "knowledge engineer".

The object models, as well as the language for these declarative rules, can differ. In one exemplary implementation of the invention, the object models are preferably of the type OWL, while F-Logic is used as the rule language. In the future, OWL will be extended to encompass capabilities for defining rules.

To process inquiries to the database system 4, defined query commands are entered into the input/output unit 6. Depending on the format for a given query command, a series of declarative rules is processed in the inference unit 5. Since the declarative rules in general are a declarative system, the sequence for the definition of the declarative rules is not important.

The declarative rules involve logical links between categories and/or attributes and/or data of the database system 4. The declarative rules allocated to a query command for generating defined output variables are evaluated in the inference unit 5. It is useful if the output variables are subsequently output via the input/output unit 6.

Linking attributes and categories via a predetermined number of declarative rules makes it easy to process a query of data subsets in the database system 4 without having to refer to specific data in the query commands. As compared to traditional database systems 4 where the query commands are limited to the data level, the option of processing a query on the category, relation and attribute levels allows for a considerable expansion and higher flexibility of the processing options.

The following illustrates the way the inference unit 5 evaluates the rules to answer the queries.

The most widely published inference approach for F-Logic is the alternating fixed point procedure [A. Van Gelder, K. A. Ross, and J. S. Schlipf: "The well-founded semantics for general logic programs"; Journal of the ACM, 38(3):620-650, July 1991]. This is a forward chaining method (see below) which computes the entire model for the set of rules, i.e. all facts, or more precisely, the set of true and unknown facts. For answering a query the entire model must be computed (if possible) and the variable substitutions for answering the query are then derived.

Forward chaining means that the rules are applied to the data and derived data as long as new data can be deduced. Alternatively, backward chaining can be used. Backward chaining means that the evaluation has the query as starting point and looks for rules with suitable predicates in their heads that match with an atom of the body of the query. The procedure is recursively continued. Also backward chaining looks for facts with suitable predicate symbols.

An example for a predicate for the F-Logic expression Y[fatherIs->X] is father (X,Y), which means that X is the father of Y "Father" is the predicate symbol. The F-Logic terminology is more intuitive than predicate logic. Predicate logic, however, is more suited for computation. Therefore, the F-Logic expressions of the ontology and query are internally rewritten in predicate logic before evaluation of the query.

In the preferred embodiment, the inference engine performs a mixture of forward and backward chaining to compute (the smallest possible) subset of the model for answering the query. In most cases, this is much more efficient than the simple forward or backward chaining evaluation strategy.

Figure 5:
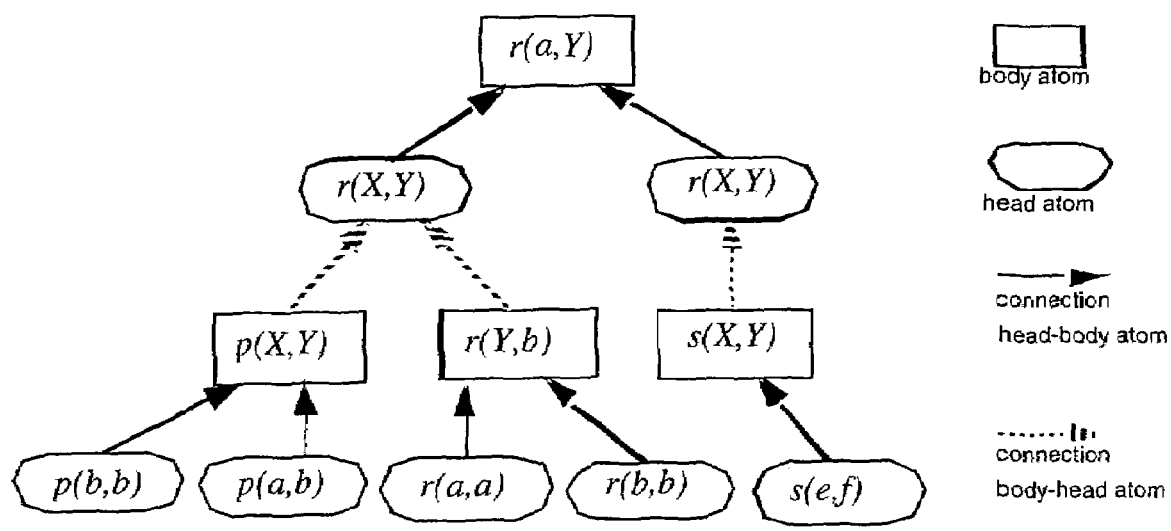
FIG. 5 shows an exemplary system graph.

The inference or evaluation algorithm works on a data structure called system graph (see e.g. FIG. 5). This graph represents the set of rules and their dependencies. Every atom of the rules (i.e. head or body, left hand or right hand side, or part of the body) is represented as a vertex of the graph. All atoms in the body of a rule—which may be connected by AND only—are connected to the head atom (header) of the rule by a connection or an edge. Every head atom, in turn, is upwardly connected to all body atoms with the same predicate symbol. Let's have a look at an example:

```
/* rules */
FORALL X,Y r(X,Y) <- p(X,Y) AND r(Y,b).
FORALL X,Y r(X,Y) <- s(X,Y).
/* facts */
q(a). p(b,b). p(a,b). r(a,a). r(b,b). s(e,f).
/* query */
FORALL Y <- r(a,Y).
```

This example is illustrated in FIG. 5.

The bottom-up evaluation using the system graph may be seen as a flow of data from the sources (facts) to the sinks (query) along the edges of the graph.

If a fact q(a1, . . . , an) flows from a head atom of rule r to a body atom q(b1, . . . , bn) of rule r' (along a solid arrow) a match operation takes place. This means that the body atom of rule r' has to be unified with the facts produced by rule r. All variable substitutions for a body atom form the tuples of a relation, which is assigned to the body atom. Every tuple of this relation provides a ground term (variable free term) for every variable in the body atom. To evaluate the rule, all relations of the body atoms are joined and the resulting relation is used to produce a set of new facts for the head atom. These facts again flow upwards in the system graph.

For the first rule

FORALL X,Y r(X,Y)<-p(X,Y) AND r(Y,b).

there are four possible input combinations, two facts for p(X,Y), namely p(b,b) and p(a,b), multiplied by two facts for r(Y,b), namely r(a,a) and r(b,b). Only the fact r(b,b) matches r(Y,b) in the rule, which leads to Y being b in the rule. With Y being b, there are two possible facts matching p(X,Y), namely p(b,b) and p(a,b). Thus, two new facts can be derived from the first rule on the left-hand side, namely r(b,b)<-p(b,b) AND r(b,b)

and r(a,b)<-p(a,b) AND r(b,b).

On the right hand side of the system graph according to FIG. 5, we see that the fact s(e,f) leads to r(e,f), applying the second rule. r(e,f), however, cannot be substituted into the query FORALL Y<-r(a,Y)

since a does not match e.

Only the fact r(a,b) derived with the first rule matches the query leading to the answer Y=b.

This evaluation strategy corresponds to the naive evaluation [J. D. Ullman: "Principles of Database and Knowledge-Base Systems"; vol. I, Computer Sciences Press, Rockville, Md., 1988] and realizes directly the above mentioned alternating fixed point procedure. Because the system graph may contain cycles (in case of recursion within the set of rules) semi naive evaluation [J. D. Ullman: "Principles of Database and Knowledge-Base Systems"; vol. I, Computer Sciences Press, Rockville, Md., 1988] is applied in the preferred embodiment to increase efficiency.

The improved bottom-up evaluation (forward chaining) of the example mentioned above is shown in FIG. 6. The facts flowing to a vertex are shown in the bubble attached to the vertex.

Figure 6:
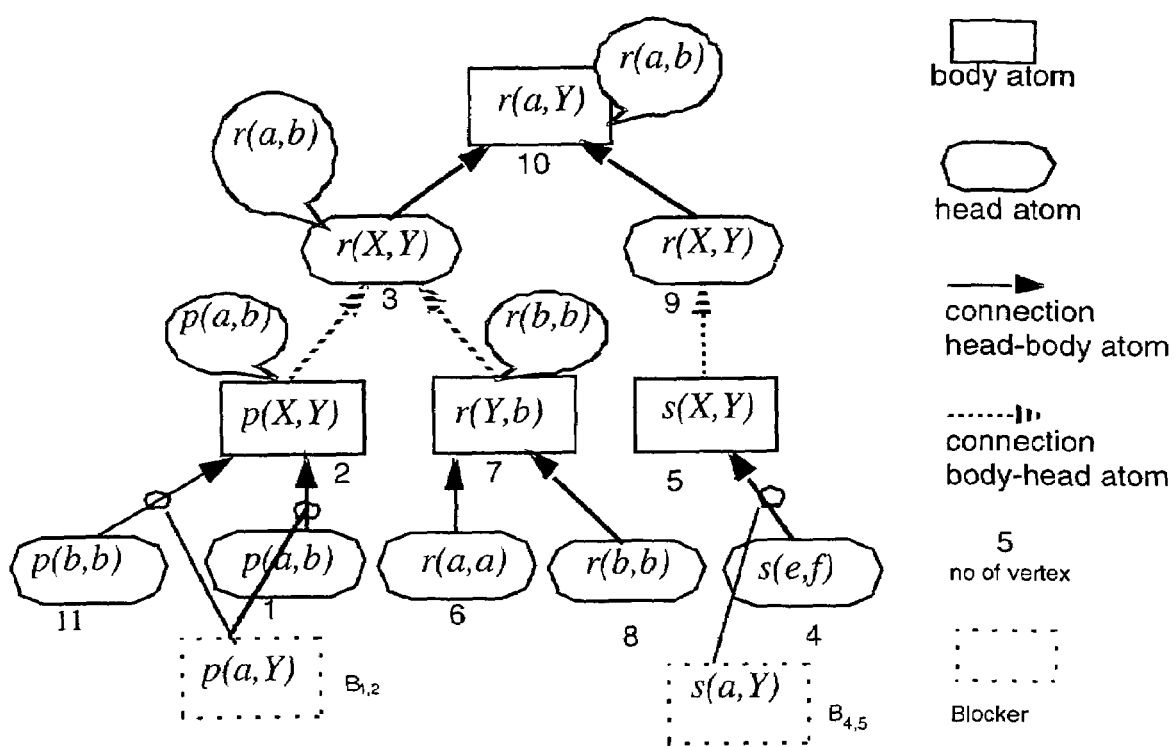
FIG. 6 shows the exemplary system graph according to FIG. 5 with improved bottom up evaluation.

FIG. 6 exemplifies that facts are created for the vertices although they are useless for answering the posed query. For instance the fact p(b,b) (vertex 11) flowing to the body vertex p(X,Y) (vertex 2) cannot contribute in any way to the answer, because in the query r(a,Y) only instances of the variable X which are equal to the constant a are relevant. Such useless facts then in turn produce new useless facts in the subsequent evaluation.

The key idea of the preferred embodiment is to abort the flow of useless facts as early as possible (i.e. as close to the sources of the graph as possible) attaching so-called blockers to the head-body edges of the graph. Such a blocker consists of a set of atoms. A blocker lets a fact pass, if there exists an atom within the blocker which matches with the fact.

For instance the blocker B1,2 between vertex 1 and vertex 2, B1,2={p(a,Y)} prevents the fact p(b,b) from flowing to the vertex 2. Additionally, the creation of the fact r(b,b) for vertex 3 is prevented by a corresponding blocker B7,3 (not shown) between vertex 7 and vertex 3. Similarly, the blocker B4,5={s(a,Y)} between vertex 4 and vertex 5 blocks the flow of facts on the right-hand side of the system graph.

Thus, the answer to the posed query r(a,Y) remains the same, although the amount of facts flowing through the graph is reduced.

The blockers at the edges of the system graph are created by propagating constants within the query, within the rules, or within already evaluated facts downwards in the graph. For instance the blocker B1,2={p(a,Y)} is determined using the constant a at the first argument position of the query r(a,Y). This blocker is valid because for the answer only facts at vertex 3 are useful containing an 'a' as first argument. So variable X in the first rule must be instantiated with 'a' in order to be useful for the query.

The blockers at the edges of the system graph are created during the evaluation process in the following way. First of all, constants within the query and within the rules are propagated downwards in the graph. Starting at the query or at a body atom, they are propagated to all head atoms, which are connected to this atom. From the head atoms they are propagated to the first body atom of the corresponding rule and from there in the same way downwards. In propagating the constants downwards, they produce new blocker atoms for the blockers at the sources.

Alternatively, blockers can also be applied in the upper layers of the system graph, but this does not lead to an improvement of the performance. Therefore, blockers are only applied at the sources of the graph.

For example, a query command may, in a particular implementation of the invention, have the following format:

"Output the names for all data for the category "persons" below the level "employees". In F-Logic:

FORALL X,Y,Z<-Z::employee and X:Z[name->Y].

The names of all technical and scientific employees stored in the database system 4 are then displayed for the user as output variable.

In another advantageous embodiment, relations between different attributes, categories and/or data can be created with the declarative rules allocated to the individual query commands. In particular, attributes, relations, categories and/or data from the various categorical structures can also be linked with the declarative rules.

One example of a query of this type can be structured as follows. A user would like to inquire about the level of knowledge of a person, known to the user, with the name "Mustermann". For one particular categorical structure, a corresponding query could be expressed in F-Logic as follows (see below for another more exhaustive example):

FORALL X,Y<-X:person[name->Mustermann; knows->>Y].

A declarative rule that can be used to process this query can be worded as follows: "If a person writes a document, and the document deals with a given subject matter, then this person has knowledge of the subject matter." Using F-Logic, this rule could be expressed in the following way (see below):

```
FORALL X,Y,Z Y[knows->>Z] <- X:document
[author->>Y:person] AND X[field->>Z].
```

The categories "persons" and "document" from two different categorical structures are linked in this way. Reference is made to the subject of the document, wherein the subject of the document is allocated as data to the attribute "subject" of the category "document".

The areas of knowledge of the person with the name "Mustermann" are obtained as output variables for the above given query.

For implementing this example, several logic languages can be used. As an example, an implementation using the preferred logic language "F-Logic" will be demonstrated.

```
/*ontology*/
author:: person. field:: science.
biotechnology: field.
physics: field.
chemistry: field.
document[author=>>author; field=>>field].
person[authorOf=>>document].
```

In this first section, the ontology itself is defined: The data contain documents with two relevant attributes—the author and the scientific field.

```
/* facts */
Paul: person.
Anna: person.
Mustermann: person.
doc1: document[field->>biotechnology; author->>Paul].
doc2: document[field->>biotechnology; author->>Paul].
doc3: document[field->>chemistry; author->>Paul].
doc100: document[field->>physics; author->>Anna].
doc101: document[field->>physics; author->>Anna].
doc200:    document[field->>biotechnology;    author->>Mustermann].
doc201:    document[field->>biotechnology;    author->>Mustermann].
doc202:    document[field->>biotechnology;    author->>Mustermann].
```

In this section, we defined the facts of the ontology. There are eight documents (named doc1, . . . , doc202) with the given fields of technology and the given authors.

```
/* query */
FORALL X <- Mustermann[knows->>X:field].
```

This section is the actual query section. Using the declarative rules defined in the previous section, we deduce, by inference, the fields of experience of the author "Mustermann".

In the inference unit 5, the above query is evaluated using the above rule. This is shown as a forward chaining process meaning that the rules are applied to the data and derived data as long as new data can be deduced.

Given the above facts about the documents and the above given rule:

```
FORALL X,Y,Z Y[knows->>Z] <- X:document
[author->>Y:person] and X[field->>Z].
``` first all substitutions of the variables X,Y and Z are computed which make the rule body true:
X=doc1, Y=Paul, Z=biotechnology
X=doc2, Y=Paul, Z=biotechnology
X=doc3, Y=Paul, Z=chemistry
X=doc100, Y=Anna, Z=physics
X=doc101, Y=Anna, Z=physics
X=doc200, Y=Mustermann, Z=biotechnology
X=doc201, Y=Mustermann, Z=biotechnology
X=doc202, Y=Mustermann, Z=biotechnology After that the variables in the rule head are substituted by these values resulting in the following set of facts:
Paul[knows->>biotechnology].
Paul[knows->>chemistry].
Anna[knows->>physics].
Mustermann[knows->>biotechnology].

In the next step for our query
FORALL X<-Mustermann[knows->>X:field].
The variable substitutions for X are computed which make the query true:
X=biotechnology This variable substitution represents the result of our query. The result is preferably output via the input/output unit 6.

The example shows that the query not only obtains information stored in the database system 4 explicitly. Rather, declarative rules of this type establish relations between elements in database systems 4, such that new facts can be derived, if necessary.

Thus, additional information, which cannot explicitly be found in the original database, is "created" (deduced) by inference: In the original database (which, in this simple example, has been "simulated" by creating the ontology in F-Logic, see above), there is no such information as "knowledge" associated (e.g. as an attribute) to a certain person. This additional information is created by inference from the authorship of the respective person, using known declarative rules.

Processing a query with the term "biotechnology" in a traditional database system would require that the user already has detailed information concerning the knowledge of Mustermann. Furthermore, the term "biotechnology" would have to be enqueued explicitly in a data record allocated to the person Mustermann.

Processing a query with the term "knowledge" in principle would not make sense for a traditional database system because the abstract term "knowledge" cannot be allocated to a concrete fact "biotechnology".

The example shows that, compared to traditional database systems, considerably less pre-knowledge, and thus also less information, is required for the computer system according to the invention to arrive at precise search results.

Figure 3:
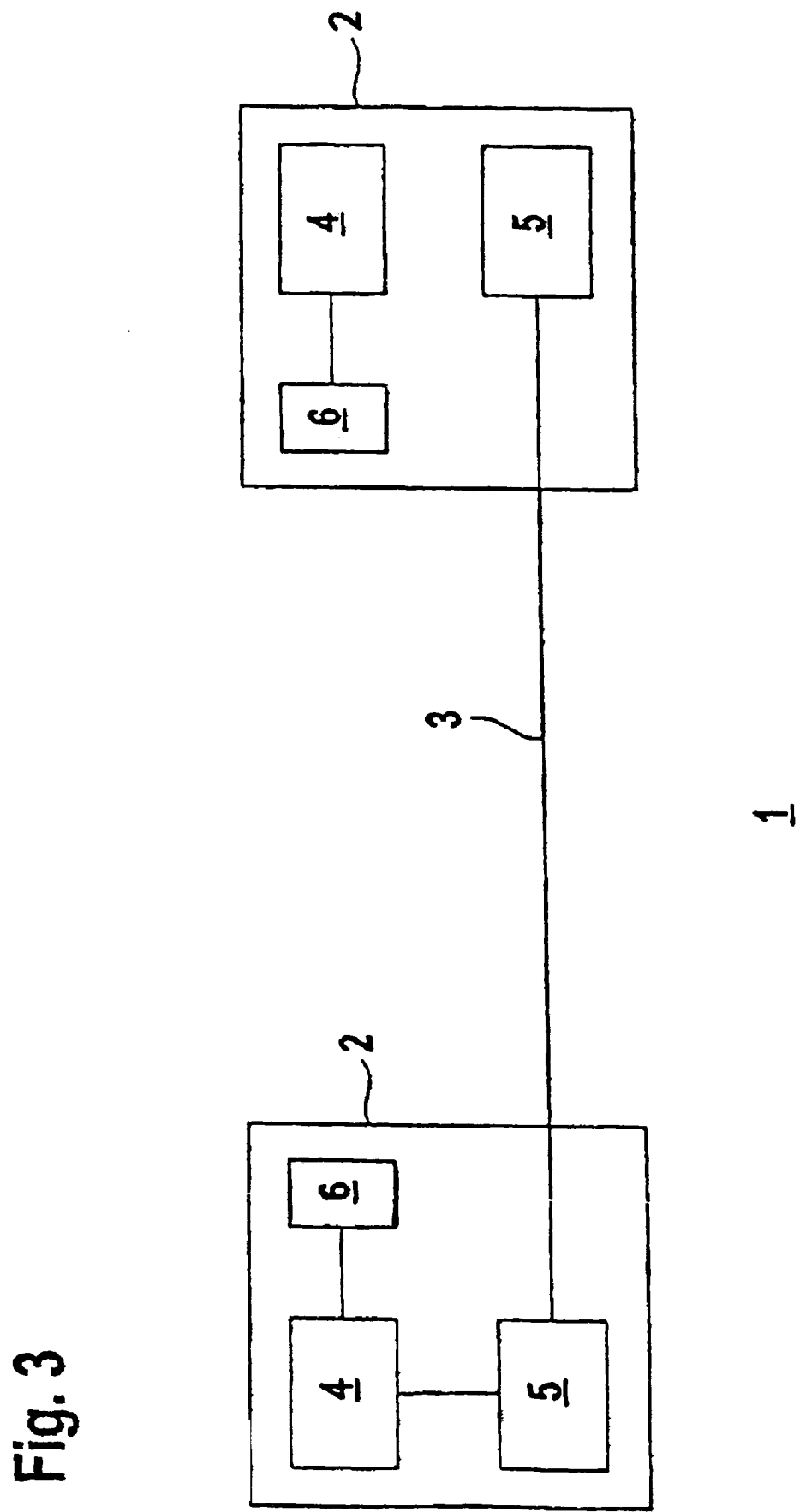
FIG. 3 shows a configuration of a second exemplary embodiment of a computer system according to the invention.

FIG. 3 shows a different exemplary embodiment of a computer system 1. This computer system comprises two computer units 2 that are connected into a network with the aid of computer lines 3. A database system 4 is implemented on each computer unit 2. The first computer unit 2 is located at a firm A while the second computer unit 2 is located at a firm B, wherein each computer unit 2 is provided with an input/output unit 6 for the operation.

The object involves setting up an automatically processed bi-directional information exchange, for example, to ensure that orders are received and processed electronically between two firms.

One problem, which generally occurs, is that even though database systems 4 in principle administer the same type of data, the data are stored under different schemata. As a result, the data records for two different database systems 4 are generally incompatible, thus making an automatic information transfer difficult.

Figure 4:
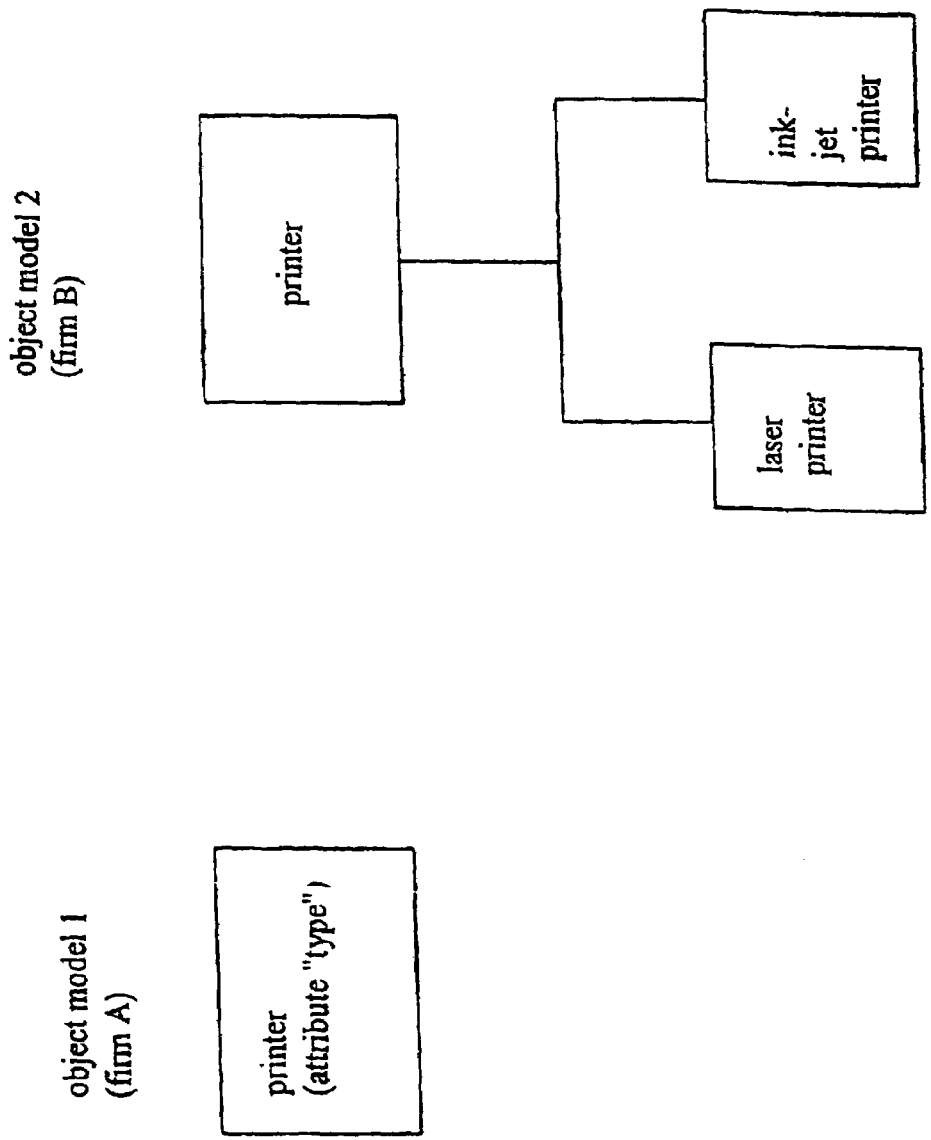
FIG. 4 shows object models for structuring data stored on the computer system according to FIG. 3.

FIG. 4 contains one such example, wherein the database system 4 of firm A is patterned according to an object model 1.

According to this model, printers produced by the firm A are allocated to a category for "printers". A differentiation is made within this category between different types of printers, e.g., inkjet printers and laser printers, by using an attribute for "type". The firm B also produces printers, which are stored in the respective database system 4 based on an object model 2. This object model has a hierarchical categorical structure in which different printer types (laser printer, inkjet printer) are allocated as sub-categories to the category for "printers".

Since the database systems 4 are structured according to different object models, data from one database system 4 can not be transferred directly to the respectively other database system 4.

To ensure, nonetheless, an automatic information exchange, an inference unit 5 is allocated to at least one database system 4 as an interface unit for information exchange between the different database systems 4. For the presently preferred embodiment, an inference unit 5 is allocated to each database system.

The inference unit 5 in the present case is operated without the aid of an input/output unit 6. Instead, the inference unit 5 defines the relations between categories and/or attributes of both object models, thus making it possible to obtain a clear allocation of the information in both database systems 4. As a result, the automatic exchange of information between both database systems 4 is made possible.

One example for a rule of this type is worded as follows: "If the attribute "type" of a printer by the firm A (object model 1) has the value "laser", then it belongs to the sub-category "laser printer" of the object model 2 (firm B)".

FORALL X X:Laser<-X:Printer[type->Laser].

Thus, this rule clearly allocates laser printers during an information transfer from firm A to firm B. An analogous rule can be formulated for inkjet printers.

Alternatively, the rule can also be worded generally, such that a clear allocation is made possible for the laser printer as well as for the inkjet printer. A generalized rule may read as follows: "If the attribute "type" of a printer by the firm A (object model 1) has the value Y, it belongs to the sub-category "Y" of the object model 2 (firm B)."

This can be expressed in F-Logic as follows:
FORALL X,Y X:Y<-X:Printer[type->Y].

The invention has been described in detail with respect to preferred embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A computer system comprising:
   a) means for storing data, the data being allocated to predetermined categories that are components of at least one stored categorical structure forming an object model;
   b) at least one inquiry unit for generating queries relating to the stored data; and
   c) at least one inference unit used to evaluate a set of declarative rules based on the generated queries, the declarative rules linking at least one predetermined category with another at least one of said categories,
   wherein the inference unit identifies constants in the queries and propagates the constants through the set of declarative rules to block data that cannot produce relevant new facts.

2. The computer system according to claim 1, wherein attributes, which are inherited within the categorical structure, are allocated to the categories.

3. The computer system according to claim 2, wherein the set of declarative rules links at least one of said categories and/or said attributes; and wherein the inference unit is used to evaluate said set of declarative rules.

4. The computer system according to claim 1, wherein relations between different categories and/or data are defined.

5. The computer system according to claim 4, wherein the set of declarative rules links at least one of said categories and/or said relations; and wherein the inference unit is used to evaluate said set of declarative rules.

6. The computer system according to claim 1, wherein the at least one inference unit, by evaluating said declarative rules, obtains as an output variable at least one of a subset or a correlation between subsets, wherein the subset or subsets may be at least one of subsets of categories, attributes, relations, and data, or a transformation of one of said subsets.

7. The computer system according to claim 1, wherein only single inheritances are permitted for a categorical structure.

8. The computer system according to claim 1, wherein multiple inheritances are permitted for a categorical structure.

9. The computer system according to claim 1, wherein the declarative rules are stored within a memory unit, associated with the at least one inference unit.

10. The computer system according to claim 1, further comprising an input/output unit connected to the at least one inference unit, wherein the input/output unit is used to input query commands for activating the at least one inference unit.

11. The computer system according to claim 10, wherein query-specific declarative rules are evaluated when a query command is input into the at least one inference unit.

12. The computer system according to claim 6, wherein the results obtained during the evaluation of the declarative rules in the at least one inference unit are output via the input/output unit.

13. The computer system according to claim 1, wherein said means for storing data comprises a database system.

14. The computer system according to claim 1, wherein the computer system comprises more than one computer.

15. The computer system according to claim 10, further comprising a network to which each computer is connected, and wherein each computer has a database system installed.

16. The computer system according to claim 10, wherein at least one of categories, attributes, relations, and data from various object models, installed on different computers, are correlated by evaluating the declarative rules in at least one inference unit.

17. The computer system according to claim 12, wherein the at least one inference unit functions as an interface unit for exchanging information between two computers, wherein said interface unit evaluates the declarative rules in order to generate a bi-directional allocation of at least one of categories, attributes, relations, and data for one object model installed on a first computer and of at least one of categories, attributes, relations, and data for a second object model in stalled on a second computer.

18. A method for storing and retrieving data in a computer system, the method comprising the steps of:
   a) generating a categorical structure in the form of an object model, the categorical structure including categories;
   b) defining a set of declarative rules linking each at least one predetermined category with another at least one of said categories;
   c) allocating the data to the categories within the categorical structure; and
   d) processing at least one query to obtain output by evaluating the set of declarative rules, which includes identifying constants in the queries and propagating the constants through the set of declarative rules so that data that cannot produce relevant new facts is blocked.

19. The method according to claim 18, wherein attributes, which are inherited within the categorical structure, are allocated to the categories; and wherein the data are allocated to the categories and/or attributes within the categorical structure.

20. The method according to claim 19, wherein the set of declarative rules links each at least one of said categories and/or said attributes with another at least one of said categories and/or said attributes; and wherein at least one query is processed to obtain output by evaluating said set of declarative rules.

21. The method according to claim 18, wherein relations between different categories and/or data are defined.

22. The method according to claim 21, wherein the set of declarative rules links each at least one of said categories and/or said relations with another at least one of said categories and/or said relations; and wherein at least one query is processed to obtain output by evaluating said set of declarative rules.

23. The method according to claim 22, further comprising the step of:
   outputting at least one output variable, in response to said at least one query, the at least one output variable comprising at least one of a subset or a correlation between subsets of at least one of categories, attributes, relations, and data, or a transformation of one of said subsets.

24. The method according to claim 18, further comprising the step of: linking at least one of categories, attributes, relations, and data from different object models using said declarative rules.

25. The method according to claim 24, wherein the different object models are stored on different computer systems connected to a network.

26. The method according to claim 25, wherein the network comprises the Internet.

27. The method according to claim 24, wherein the step of processing at least one query further comprises the step of: entering by a user of one computer system a query applicable to data stored on at least one other computer system.

28. A computer system including a processor executing the method according to claim 18.

29. A computer-readable medium containing software code implementing the method according to claim 18.

30. A computer system comprising: at least one processor; and at least one computer-readable medium according to claim 29.

31. The computer system according to claim 30, wherein the least one processor comprises a plurality of processors, and further comprising: a network connecting the plurality of processors.

32. A modulated data signal carrying the software code embodied on the computer-readable medium according to claim 29.

33. The computer system according to claim 1,
where the inference unit includes means for aborting a predetermined flow of data during the evaluation.

34. The method according to claim 18, wherein the processing step includes aborting a predetermined flow of data during the evaluation.

* * * * *